United States Patent [19]

Igarashi et al.

[11] Patent Number: 5,585,431
[45] Date of Patent: *Dec. 17, 1996

[54] THERMOPLASTIC ELASTOMER POWDER COMPOSITION FOR POWDER MOLDING, POWDER MOLDING METHOD USING THE SAME AND MOLDED ARTICLE THEREOF

[75] Inventors: Toshio Igarashi, Kyoto; Sueharu Shinohara, Takatsuki; Masayuki Tatsumi, Ibaraki; Tadashi Hikasa, Sodegaura; Hiroaki Mendori, Ichihara, all of Japan

[73] Assignee: Sumitomo Chemical Company, Limited, Osaka, Japan

[*] Notice: The portion of the term of this patent subsequent to May 3, 2011, has been disclaimed.

[21] Appl. No.: 957,187

[22] Filed: Oct. 7, 1992

Related U.S. Application Data

[63] Continuation-in-part of Ser. No. 865,619, Apr. 9, 1992, abandoned.

[30] Foreign Application Priority Data

Apr. 11, 1991 [JP] Japan ................. 3-078975

[51] Int. Cl.$^6$ ............... C08K 3/04; C08K 3/22; C08K 3/26
[52] U.S. Cl. ............ 524/425; 524/430; 524/437; 524/496; 524/528; 525/193; 525/194; 525/239; 525/240
[58] Field of Search ................. 524/496, 528, 524/425, 430, 437; 525/240, 193, 194

[56] References Cited

U.S. PATENT DOCUMENTS

| | | | |
|---|---|---|---|
| 3,379,673 | 4/1968 | Rossman et al. | 524/496 |
| 4,115,508 | 9/1978 | Hughes | 264/310 |
| 4,267,080 | 5/1981 | Yokoyama et al. | 260/4 R |
| 4,319,004 | 3/1982 | Spielau et al. | 525/240 |
| 4,748,206 | 5/1988 | Nogiwa et al. | 525/240 |

FOREIGN PATENT DOCUMENTS

| | | |
|---|---|---|
| 0338860 | 10/1989 | European Pat. Off. . |
| 0409992 | 1/1991 | European Pat. Off. . |
| 0479580 | 4/1992 | European Pat. Off. . |
| 3031508 | 2/1982 | Germany ............. 525/240 |

OTHER PUBLICATIONS

World Patents Index Latest Week 9014 Derwent Publications Ltd, AN 90–104961 & JP–A–2057309.
World Patents Index Latest Week 9014 Derwent Publications Ltd, AN 90–104962 & JP–A–2057310.
World Patents Index Latest Week 9137 Derwent Publications Ltd, AN 91–270317 & JP–A–3177447.

*Primary Examiner*—Carman J. Seccuro, Jr.
*Attorney, Agent, or Firm*—Cushman Darby & Cushman, IP Group of Pillsbury Madison & Sutro LLP

[57] ABSTRACT

A thermoplastic elastomer powder composition for powder molding, comprising 100 parts by weight of the following thermoplastic elastomer powder (A) and 0.05 to 20 parts by weight of a fine powder having an average particle diameter of 30 µm or less:

(A) (i) a powder of a thermoplastic elastomer comprising a composition composed of an ethylene-α-olefin copolymer rubber and a polyolefin resin or (ii) a powder of a thermoplastic elastomer comprising a partially crosslinked composition composed of an ethylene-α-olefin copolymer rubber and a polyolefin resin, the thermoplastic elastomer powder having a complex dynamic viscosity $\eta^*(1)$, as measured at a frequency of 1 radian/sec and at 250° C., of $1.5 \times 10^5$ poise or less and a Newtonian viscosity index n, calculated from the following formula by using the above-mentioned complex dynamic viscosity $\eta^*(1)$ and the complex dynamic viscosity $\eta^*(100)$ measured at a frequency of 100 radian/sec of 0.67 or less:

$$n = (\log \eta^*(1) - \log \eta^*(100))/2.$$

15 Claims, 2 Drawing Sheets

THERMOPLASTIC ELASTOMER POWDER COMPOSITION FOR POWDER MOLDING, POWDER MOLDING METHOD USING THE SAME AND MOLDED ARTICLE THEREOF

CROSS-REFERENCE TO RELATED APPLICATION

This application is a continuation-in-part of Ser. No. 07/865,619, filed Apr. 9, 1992, now abandoned.

BACKGROUND OF THE INVENTION

1. Field of the Invention

The present invention relates to a thermoplastic elastomer powder composition for powder molding, a powder molding method using the same, and a molded article thereof.

2. Description of the Related Art

A powder molded article of a polyvinyl chloride powder composition containing a plasticizer is used for interior decorative materials of automobiles, for example, as a covering material for an instrument panel, a console box, an arm rest, a head rest and a door rim.

The molded article, however, has drawbacks in that the polyvinyl chloride has a poor lightweight property and poor non-pollution properties, because acidic substances generated by the thermal disposal of a motor vehicle cassation induce air pollution and acid rain, etc., and further, has drawbacks in that the plasticizer causes a clouding of the internal surface of a front window of automobiles. These drawbacks render the use of the above-mentioned molded article unsatisfactory.

The present inventors have studied ways in which to alleviate the drawbacks of the above-mentioned polyvinyl chloride powder composition, and previously proposed an olefin type thermoplastic elastomer powder for powder molding (see Japanese Patent Application Nos. 3-199579 and 3-199589).

Thereafter, the present inventors continued their studies, and as a result, encountered a problem that, although the thermoplastic elastomer powder exhibits a good flowability immediately after the preparation by pulverization, an aggregation occurs among the powder particles when the powder is allowed to stand for a long time, and thus the powder no longer exhibits the flowability necessary for powder molding.

Further, when use is made of a powder slush molding method, which comprises bringing a powder into contact with a heated mold to heat-fuse powder particles to each other and returning powder particles not subjected to heat fusing to a powder feed box, the repeated use of the powder not subjected to heat fusing causes the powder to be gradually heated, and this heat is stored in the powder feed box. This gradually causes an aggregation between powder particles to occur, which deteriorates the flowability of the powder, so that a continuous operation for a long time gives rise to the production of molded articles having an underfill and pin holes.

SUMMARY OF THE INVENTION

Accordingly, an object of the present invention is to eliminate the above-mentioned disadvantages and to provide a thermoplastic elastomer powder composition for powder molding capable of exhibiting a good powder flowability even after storage for a long time, and capable of providing a molded article having neither an underfill nor pin holes produced even when the molding is continuously conducted, for example, by powder slush molding, for a long time.

Other objects and advantages of the present invention will be apparent from the following description.

In accordance with the present invention, there is provided a thermoplastic elastomer powder composition for powder molding, comprising 100 parts by weight of the following thermoplastic elastomer powder (A) and 0.05 to 20 parts by weight of a fine powder having an average particle diameter of 30 μm or less:

(A) (i) a powder of a thermoplastic elastomer comprising a composition composed of an ethylene-α-olefin copolymer rubber and a polyolefin resin or (ii) a powder of a thermoplastic elastomer comprising a partially crosslinked composition composed of an ethylene-α-olefin copolymer rubber and a polyolefin resin, the thermoplastic elastomer powder having a complex dynamic viscosity $\eta^*(1)$ as measured at a frequency of 1 radian/sec and at 250° C., of $1.5 \times 10^5$ poise or less and a Newtonian viscosity index n, calculated from the following formula by using the above-mentioned complex dynamic viscosity $\eta^*(1)$ and the complex dynamic viscosity $\eta^*(100)$ measured at a frequency of 100 radian/sec of 0.67 or less:

$$n = (\log \eta^*(1) - \log \eta^*(100))/2,$$

a powder molding method using the same, and a molded article thereof.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
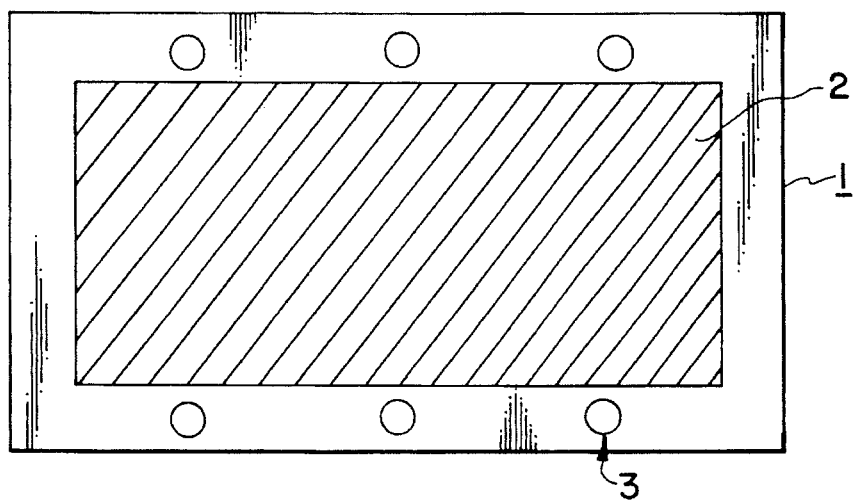
FIG. 1 is a plan view of a powder feed box.

The present invention will now be described in more detail.

Examples of the ethylene-α-olefin copolymer rubber include rubbers composed mainly of olefins, such as ethylene-propylene copolymer rubbers and ethylene-propylene-nonconjugated diene copolymer rubbers. Examples of the nonconjugated diene include dicyclopentadiene, ethylidenenorbornene, 1,4-hexadiene, cyclooctadiene and methylene-norbornene. Among others, an ethylene-propylene-ethylidenenorbornene rubber (hereinafter referred to as "EPDM") is preferred, as the use of this rubber enables a molded article having an excellent, for example, heat resistance and tensile properties, to be obtained.

The Mooney viscosity (Mooney viscosity measured at 100° C. according to ASTM D-927-57T ($ML_{1+4}$ at 100° C.)) of the ethylene-α-olefin copolymer rubber is preferably from 130 to 350, more preferably from 200 to 300.

Also, preferably an oil-extended olefin copolymer rubber comprising an ethylene-α-olefin copolymer rubber, and added thereto, a mineral oil softening agent such as a paraffinic process oil, is used, as this contributes to an improvement in the melt flowability, and at the same time, improves the flexibility of the molded article. The content of the mineral oil softening agent is preferably from 30 to 120 parts by weight, based on 100 parts by weight of the ethylene-α-olefin copolymer rubber.

Preferred examples of the polyolefin resin include polypropylene, a copolymer of propylene with ethylene, and a copolymer of propylene with an α-olefin other than propylene. In particular, the use of the copolymer of propylene with butene enables the hardness of the molded article to be lowered.

When the melt flow rate of the polyolefin resin (MFR measured at 230° C. under a load of 2.16 kg according to JIS (Japanese Industrial Standards) K-7210) is less than 20 g/10 min, it becomes difficult for powder particles to melt and adhere to each other during the powder molding, and thus the strength of the molded article is lowered. Accordingly, the MFR of the polyolefin resin used is preferably 20 g/10 min or more, more preferably 50 g/10 min or more.

In the present invention, the thermoplastic elastomer comprises a composition composed of the above-mentioned ethylene-α-olefin copolymer rubber and the above-mentioned polyolefin resin, or a partially crosslinked composition produced by dynamically crosslinking the above-mentioned composition. Preferably, the weight ratio of the ethylene-α-olefin copolymer rubber to the olefin resin is from 5:95 to 80:20, more preferably 20:80 to 80:20.

In the dynamic crosslinking, preferably an organic peroxide is employed as a crosslinking agent, and preferably a dialkyl peroxide is used as the organic peroxide. Also, preferably the dynamic crosslinking is conducted in the presence of a crosslinking coagent, such as a bismaleimide compound, through the use of a very small amount of an organic peroxide. This enables the ethylene-α-olefin copolymer to be adequately crosslinked, whereby a heat resistance is imparted thereto, and at the same time, a high flowability is realized.

The crosslinking agent is used in an amount of 1.5 parts by weight or less, preferably 0.6 part by weight or less, based on 100 parts by weight of the composition comprising an ethylene-α-olefin copolymer rubber and a polyolefin resin, and the organic peroxide is used in an amount of 0.2 part by weight of less, preferably 0.1 part by weight or less, more preferably 0.07 part by weight or less.

A continuous kneading extruder, such as a single screw kneading extruder or a twin screw kneading extruder, is preferably used as the apparatus for the dynamic crosslinking. When a twin screw kneading extruder is used, an extrusion crosslinking at a shear rate of less than $10^3$ $sec^{-1}$ causes the diameter of the dispersed particles of the ethylene-α-olefin copolymer rubber to become so large that is unpreferably causes a poor appearance of product. Accordingly, preferably the continuous extrusion crosslinking is conducted at a shear rate of $10^3$ $sec^{-1}$ or more.

The thermoplastic elastomer according to the present invention has a complex dynamic viscosity $\eta^*(1)$, when measured at a frequency of 1 radian/sec and 250° C., of $1.5\times10^5$ poise or less, preferably $1.0\times10^5$ poise or less, more preferably $3.0\times10^4$ poise or less.

When the complex dynamic viscosity $\eta^*(1)$ exceeds $1.5\times10^5$ poise, the elastomer powder prepared by using such an elastomer composition will not be melted and adhered to the mold surface, and thus it becomes difficult to conduct a molding by powder molding wherein the shear rate during the molding is very small, i.e., 1 $sec^{-1}$ or less.

The Newtonian viscosity index n, calculated from the following formula by using the above-mentioned complex dynamic viscosity $\eta^*(1)$ and the complex dynamic viscosity $\eta^*(100)$ measured at a frequency of 100 radian/sec and at 250° C., is 0.67 or less, preferably 0.60 or less, and more preferably 0.53 or less.

$$n=(\log\eta^*(1)-\log\eta^*(100))/2.$$

When the Newtonian viscosity index n exceeds 0.67, even though the complex dynamic viscosity $\eta^*(1)$ is $1.5\times10^5$ poise or less, measured at a frequency of 1 radian/sec, the dependence on the frequency of the complex dynamic viscosity on the frequency becomes greater. In this case, in a molding method such as powder molding wherein the shaping pressure during the molding is very small, i.e., 1 $kg/cm^2$ or less, the mutual thermal fusion between melted elastomer powder particles becomes incomplete, and thus only a molded article having low mechanical properties can be obtained.

The elastomer composition in the present invention can be formed into an elastomer composition having an excellent flexibility, by blending an uncrosslinked ethylene-α-olefin copolymer rubber of ethylene-α-olefin copolymer resin in an amount of 50 parts by weight or less based on 100 parts by weight of the partially crosslinked type elastomer composition. As the α-olefin used in this case, propylene and butene, etc., are used alone or in a combination thereof. An ethylene-propylene copolymer rubber having an ethylene content of 40 to 90% by weight, preferably 70 to 85% by weight and a $ML_{1+4}$ at 100° C. of 50 or less is particularly preferred.

The thermoplastic elastomer powder is produced by pulverizing the above-mentioned thermoplastic elastomer composition, for example, at a glass transition temperature or less. The average particle diameter is preferably from 100 to 300 μm.

The thermoplastic elastomer powder composition according to the present invention is characterized by comprising the above-mentioned thermoplastic elastomer powder and a particular amount of a fine powder. The average particle diameter of the fine powder is preferably 30 μm or less, more preferably from 0.01 to 10 μm. When the average particle diameter exceeds 30 μm, a good powder flowability cannot be maintained during a storage for a long time.

Examples of the fine powder include organic pigments, such as azo, phthalocyan, indanthrene and dye lake pigments, inorganic pigments such as oxide pigments, e.g., titanium oxide, chromomolybdic acid, sulfide selenium compound, ferrocyanide and carbon black pigments; and powders such as aluminum oxides, aluminum hydroxides and calcium carbonate. Among them, the pigments are preferred because they can maintain a good powder flowability and color the molded article even when used in a small amount, which enables the subsequent coloring step to be omitted.

In addition to the above-mentioned fine powder, fine thermoplastic resin powder can also be used as the fine powder. Examples of such a thermoplastic resin powder are those of polypropylene resins such as homopolypropylene, propylene-ethylene random copolymer, propylene-ethylene block copolymer, propylene-butene random copolymer, propylene-ethylene-butene terpolymer, etc.; polyethylene resins such as high pressure polyethylene, low pressure polyethylene, linear low density polyethylene, ethylene-vinyl acetate copolymer, ethylene-methacrylic acid copolymer, ethylene-acrylate-maleic anhydride terpolymer, ethylene-glycidyl methacrylate copolymer, ethylene-glycidyl/methacrylate-vinyl acetate terpolyer, ethylene, glycidyl methacrylate-methacrylate terpolymer, ethylene-α-olefin copolymer, modified polyolefin, chlorinated polyethylene; etc.; vinyl resins such as poly(vinyl chloride), vinyl chloride-vinyl acetate copolymer chlorinated poly(vinyl chloride), vinyl chloride-ethylene-vinyl acetate copolymer, vinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, styrene-divinyl benzene copolymer, etc. These resin powders may be used alone or in any mixture thereof. Among these resin powders, polyolefin resin powders such as polypropylene resin powders and polyethylene resin powders may be preferably used.

The fine thermoplastic resin powders usable in the present invention preferably have a melt flow rate (MFR) of 3 g/10 min or more, determined at 190° C. or 230° C. under a load of 2.16 kg according to a method set forth is JIS (i.e., Japanese Industrial Standards)-K-7210 and a particle size such that 95% of the total weight passes through a 32 mesh tylar standard sieve.

The content of the fine powder is 0.05 to 20 parts by weight, preferably 0.1 to 10 parts by weight, more preferably 0.1 to 4 parts by weight, based on 100 parts by weight of the thermoplastic elastomer powder. When the content is less than 0.05 part by weight, it becomes difficult to maintain a good powder flowability during a storage for a long time, and when the content exceeds 20 parts by weight, it is impossible to prepare a molded article having a sufficiently high strength obtained from the thermal fusing between powder particles.

There is no particular limitation on the method of incorporating the fine powder in the thermoplastic elastomer powder, as long as the fine powder can be homogeneously dispersed, and examples of such a method include one wherein blending is conducted through the use of a blender provided with a heating jacket, a high-speed rotary mixer or the like. Among others, a method, for example, using a super mixer, wherein the fine powder is homogeneously dispersed while preventing a mutual fusion between powder particles by applying a shearing force is preferred. Further, the fine powder may be added while heating to an extent such that a mutual adhesion of the powder particles occurs.

Further, the elastomer powder composition according to the present invention can contain an internally adding release agent. The internally adding release agent is preferably a methylpolysiloxane compound, and the incorporation thereof in an amount of 2 parts by weight or less based on 100 parts by weight of the elastomer powder composition is effective. In this case, the release agent may be added at any stage before or after the purverization. The viscosity at 25° C. of the methylpolysiloxane compound may be 20 cSt or more, preferably in the range of from 50 to 5000 cSt. When the viscosity becomes too large, the effect of the release agent is decreased, and when the amount of the internally adding release agent is larger than 2 parts by weight, the thermal fusion between elastomer powder particles is inhibited, and thus only a molded article having poor mechanical properties can be obtained. Further, in this case, the internally adding release agent bleeds out onto the surface of the mold, and thus unfavorably contaminates the mold.

Further, the elastomer powder composition of the present invention may contain necessary amounts of known heat-resistant stabilizers such as phenol type, sulfite type, phenylalkane type, phosphite type, amine type or amide type stabilizers, antioxidants, weathering resistant stabilizers, antistatic agents, metal soaps, lubricants such as waxes, and pigments for coloration.

The above-mentioned elastomer powder composition has an excellent powder flowability and can be easily melted by heat fed from the mold, at a low shear rate under a low pressure, and thus is an excellent composition for a powder molding, for example, fluidized bed coating, immersion, electrostatic coating, powder flame spray coating, powder rotational molding and powder slush molding, and is an especially excellent composition for a powder slush molding (see Japanese Unexamined Patent Publication (Kokai) No. 58-132507).

In the powder molding, there is no particular limitation on a system for heating a mold, and examples of the heating system include a gas-fired furnace system, a heat medium oil circulation system, a system of dipping into a heated oil or a hot fluidized sand and a high-frequency induction heating system.

The elastomer powder composition of the present invention exhibits an excellent powder flowability even when stored for a long time. Further, when the powder composition of the present invention is used, it becomes possible to produce a molded article having an even thickness and free from pinholes, even when the powder molding is continuously conducted for a long time, and further, it becomes possible to produce a lightweight and non-pollutive molded article.

The molded article of the present invention can be used, for example, as a covering material for domestic electric appliances, office devices, chairs, and furniture, etc., particularly as an interior covering material in the automobile field for instrument panels, console boxes, arm rests, and door rims, etc.

EXAMPLES

The present invention will now be described in more detail with reference to the following Examples, to which it is in no way limited.

The dynamic viscoelasticity, powder properties, and moldability were determined by the following methods.

Dynamic Viscoelasticity of Thermoplastic Elastomer

The dynamic viscoelasticities at vibration frequencies of 1 radian/sec and 100 radian/sec were measured by using a dynamic analyzer Model DRS-770D manufactured by Rheometrics Co., and the complex dynamic viscosities $\eta^*(1)$ and $\eta^*(100)$ were calculated.

The measurement was conducted in the parallel plate mode under the conditions of an applied strain of 5% and a sample temperature of 250° C.

The Newtonian viscosity index n was calculated according to the following equation, based on the results of $\eta^*(1)$ and $\eta^*(100)$.

$$n = (\log \eta^*(1) - \log \eta^*(100))/2.$$

Flowability of Powder

The elastomer powder composition was allowed to stand in an atmosphere of 25° C. for one month, and thereafter, 100 ml of the elastomer powder composition was charged to a funnel of a bulk specific gravity measuring device as specified in JIS K-6721. The dumper was withdrawn, and the time (sec) from the start of powder dropping until all the powder had dropped was measured. The shorter the time, the better the powder flowability.

Blocking Tendency

The elastomer powder composition was allowed to stand in an atmosphere of 25° C. for one month, while a pressure of 500 kg/m² was applied to the powder composition. Thereafter, the powder composition was gently transferred on to a 32-mesh sieve of a Tyler standard screen scale sieve, the sieve was shaken for 10 sec, and the percentage (% by weight) of powder remaining on the 32-mesh sieve was calculated. The lower the percentage (% by weight), the lower the liability of the elastomer powder composition to cause blocking.

Moldability of Powder

First, 500 g of the elastomer powder composition was sprinkled over an embossed nickel plate having a size of 30 cm×30 cm and a thickness of 3 mm, and having a surface heated at 250° C., and adhered thereto for 14 sec, and then unadhered powder of the elastomer powder was discharged and the powder-adhered embossed plate was heated and melted in a heating furnace having an atmosphere of 280° C. for 60 sec. The powder moldability was evaluated, according to the following standards, from the fused state of the powder on the mold, and the properties of the molded sheet obtained by demolding after cooling the mold to 70° C. with water.

++: sufficient mutual fusion between powder particles of the composition was observed, and tensile strength of the molded sheet was sufficiently high.

+: sufficient mutual fusion between powder particles of the composition was observed, and tensile strength of resultant molding sheet was high.

±: although mutual fusion between powder particles of the composition observed, molded sheet had a low tensile strength and was fragile.

−: powder particles of the composition were not mutually fused, and as such, remained on the mold.

++ and + mean that the powder composition can be molded into a final product, and ± and − mean that the powder composition cannot be molded into a final product.

REFERENCE EXAMPLE 1

A 40 parts by weight amount of an oil-extended EPDM ($ML_{1+4}$ at 100° C.=53) comprising 100 parts by weight of EPDM ($ML_{1+4}$ at 100° C.=242, propylene content=28% by weight, and iodine value=12), and added thereto, 100 parts by weight of a mineral oil softening agent (Diana Process® PW-380 manufactured by Idemitsu Kosan Co., Ltd.), was kneaded with 60 parts by weight of a propylene-butene random copolymer resin (butene content=24% by weight, MFR=90 g/10 min) and 0.4 part by weight of a crosslinking coagent (Sumifine® BM-bismaleimide compound manufactured by Sumitomo Chemical Co., Ltd.) for 10 min, by a Banbury mixer, and fed into an extruder to form a masterbatch (hereinafter referred to as "M.B.") in a pellet form for crosslinking.

To 100 parts by weight of the M.B. was added 0.04 part by weight of an organic peroxide [Sanperox® APO (2,5-dimethyl-2,5-di(t-butylperoxy)hexane manufactured by Sanken Chemical Co., Ltd.], and a dynamic crosslinking was conducted at 220° C. by using a twin screw kneader (TBX®-44 manufactured by The Japan Steel Works, Ltd.) to give a pellet having an elastomer composition. The pellet was cooled to a temperature of −100° C., by liquid nitrogen, and then freeze-pulverized to obtain a thermoplastic elastomer powder having a complex dynamic viscosity $\eta^*(1)$ of $7\times10^3$ poise and a Newtonian viscosity index n of 0.39.

EXAMPLE 1

A 100 parts by weight amount of the thermoplastic elastomer powder prepared in Reference Example 1 was dry-blended with 0.1 part by weight of a black pigment (PV-817 having an average particle diameter of 0.02 μm manufactured by Sumika Color Co., Ltd.) by a supermixer, at 25° C. and 500 rpm for 10 min, to give a thermoplastic elastomer powder composition for powder molding.

The properties and moldability of the composition thus obtained were evaluated, and the results are shown in Table 1.

EXAMPLE 2

A thermoplastic elastomer powder composition for powder molding was prepared in the same manner as in Example 1, except that the amount of black pigment added was changed to 1.5 parts by weight. The evaluation results are shown in Table 1.

EXAMPLE 3

A thermoplastic elastomer powder composition for powder molding was prepared in the same manner as in Example 1, except that the amount of black pigment added was changed to 10 parts by weight. The evaluation results are shown in Table 1.

EXAMPLE 4

A thermoplastic elastomer powder composition for powder molding was prepared in the same manner as in Example 2, except that a red pigment (PV-110 having an average particle diameter of 0.18 μm manufactured by Sumika Color Co., Ltd.) was used instead of the black pigment. The evaluation results are shown in Table 1.

EXAMPLE 5

A thermoplastic elastomer powder composition for powder molding was prepared in the same manner as in Example 2, except that a yellow pigment (PV-354 having an average particle diameter of 0.13 μm manufactured by Sumika Color Co., Ltd.) was used instead of the black pigment. The evaluation results are shown in Table 1.

EXAMPLE 6

A thermoplastic elastomer powder composition for powder molding was prepared in the same manner as in Example 2, except that a white pigment (PV-742 having an average particle diameter of 0.2 μm manufactured by Sumika Color Co., Ltd.) was used instead of the black pigment. The evaluation results are shown in Table 1.

EXAMPLE 7

A thermoplastic elastomer powder composition for powder molding was prepared in the same manner as in Example 2, except that aluminum oxide (AM-21 having an average particle diameter of 5 μm manufactured by Sumitomo Chemical Co., Ltd.) was used instead of the black pigment. The evaluation results are shown in Table 1.

EXAMPLE 8

A thermoplastic elastomer powder composition for powder molding was prepared in the same manner as in Example 2, except that aluminum oxide (AES-12 having an average particle diameter of 0.4 μm manufactured by Sumitomo Chemical Co., Ltd.) was used instead of the black pigment. The evaluation results are shown in Table 1.

EXAMPLE 9

A thermoplastic elastomer powder composition for powder molding was prepared in the same manner as in Example 2, except that vinyl chloride for a paste (PxQLT having an average particle diameter of 1.2 μm manufactured by Sumitomo Chemical Co., Ltd.) was used instead of the black pigment. The evaluation results are shown in Table 1.

EXAMPLE 10

A thermoplastic elastomer powder composition for powder molding was prepared in the same manner as in Example 2, except that vinyl chloride for a paste (having an average particle diameter of 0.08 μm manufactured by Sumitomo Chemical Co., Ltd.) was used instead of the black pigment. The evaluation results are shown in Table 1.

COMPARATIVE EXAMPLE 1

A thermoplastic elastomer powder composition for powder molding was prepared in the same manner as in Example 1, except that no black pigment was used. The evaluation results are shown in Table 1.

COMPARATIVE EXAMPLE 2

A thermoplastic elastomer powder composition for powder molding was prepared in the same manner as in Example 1, except that the black pigment was used in an amount of 25 parts by weight. The evaluation results are shown in Table 1.

COMPARATIVE EXAMPLE 3

A thermoplastic elastomer powder composition for powder molding was prepared in the same manner as in Example 2, except that aluminum oxide (A-21 having an average particle diameter of 50 μm manufactured by Sumitomo Chemical Co., Ltd.) was used instead of the black pigment. The evaluation results are shown in Table 1.

EXAMPLES 11 TO 16

Thermoplastic elastomer powder compositions for powder molding were prepared in the same manner as in Example 1, except that the black pigment was used in an amount (parts by weight) specified in Table 2. The evaluation results are shown in Table 2.

COMPARATIVE EXAMPLE 4

A thermoplastic elastomer powder was prepared in the same manner as in Reference Example 1, except that the oil-extended EPDM was used in an amount of 70 parts by weight and 30 parts by weight of a propylene-ethylene random copolymer resin (ethylene content=3% by weight, MFR=1.2 g/10 min) was used instead of the propylene-butene random copolymer resin.

The powder had a η*(1) value of $1.9 \times 10^5$ poise and a Newtonian viscosity index n of 0.69.

This powder was subjected to the same treatment as that of Example 1, to give thermoplastic elastomer powder composition. The evaluation results are shown in Table 2.

EXAMPLE 17

A thermoplastic elastomer powder composition for powder molding was prepared in the same manner as in Example 1, except that 0.22 part by weight of a black pigment, 0.53 part by weight of a red pigment (PV-110 manufactured by Sumika Color Co., Ltd.), 1.15 parts by weight of a yellow pigment (PV-354 manufactured by Sumika Color Co., Ltd.), and 0.05 part by weight of a white pigment (PV-742 manufactured by Sumika Color Co., Ltd.) were used as the fine powder. The evaluation results are shown in Table 3.

EXAMPLES 18 AND 19

The thermoplastic elastomer powder compositions prepared in the same manner as in Example 17 were respectively allowed to stand in a Geer oven at 40° C. and 60° C. for 8 hr, and then subjected to an evaluation of the powder flowability and powder moldability thereof. The evaluation results are shown in Table 3.

EXAMPLE 20

A thermoplastic elastomer powder composition for powder molding was prepared by dry blending 100 parts by weight of the thermoplastic elastomer powder prepared in Reference Example 1 with 10 parts by weight of fine polypropylene (Ranko Wax PP-1362-D, manufactured Sansho K.K., average particle diameter =3.5 μm) at 25° C. and 500 r.p.m. for 10 minutes by a supermixer.

The properties and moldability of the composition thus obtained were evaluated. The results are shown in Table 4 below.

EXAMPLE 21

A thermoplastic elastomer powder composition for powder molding was prepared in the same manner as in Example 20, except that the polypropylene was changed to 10 parts by weight of low density polyethylene (MFR=75 g/10 min, average diameter=3 μm). The evaluation results are shown in Table 4.

EXAMPLE 22 AND 23

A thermoplastic elastomer powder composition for powder molding was prepared in the same manner as in Example 21, except that the amounts of the low density polyethylene used were changed to 1 and 3 parts by weight, respectively. The evaluation results are shown in Table 4.

EXAMPLE 24

A thermoplastic elastomer powder composition for powder molding was prepared in the same manner as in Example 21, except that 10 parts by weight of a low density polyethylene having an average diameter of 6 μm was used. The evaluation results are shown in Table 4.

EXAMPLE 25

A thermoplastic elastomer powder composition for powder molding was prepared in the same manner as in Example 21, except that 3 parts by weight of a low density polyethylene having an average particle size of 10 μm was used. The evaluation results are shown in Table 4.

EXAMPLE 26

A thermoplastic elastomer powder composition for powder molding was prepared in the same manner as in Example 20, except that 10 parts by weight of a crosslinked polystyrene (Fine Pearl PB-3006-E, an average particle diameter of 6 μm manufactured by Sumitomo Chemical Co., Ltd) was used. The evaluation results are shown in Table 4.

COMPARATIVE EXAMPLE 5

A thermoplastic elastomer powder composition for powder molding was prepared in the same manner as in Example 21, except that the low density polyethylene was used in an amount of 30 parts by weight. The evaluation results are shown in Table 4.

COMPARATIVE EXAMPLE 6

A thermoplastic elastomer powder composition for powder molding was prepared in the same manner as in Example 20, except that 10 parts by weight of a crosslinked acryl bead (Sumipex-B XC-01, an average particle diameter of 35 μm manufactured by Sumitomo Chemical Co., Ltd.) was used. The evaluation results are shown in Table 4.

EXAMPLE 27

Figure 2:
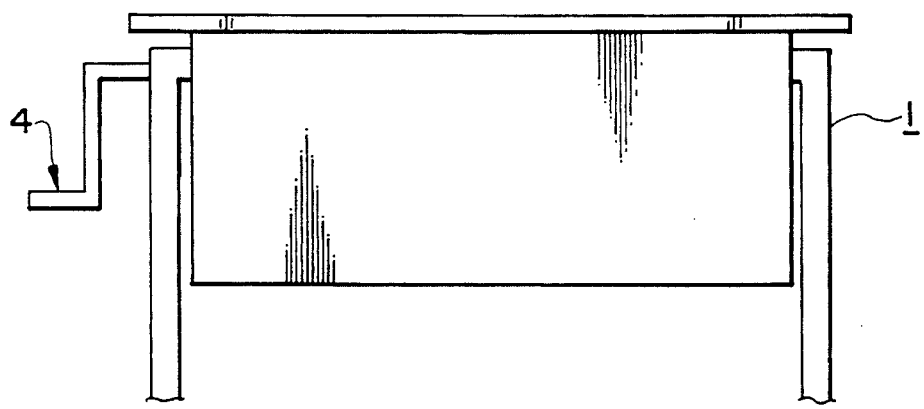
FIG. 2 is an elevation view of a mold.
Figure 3:
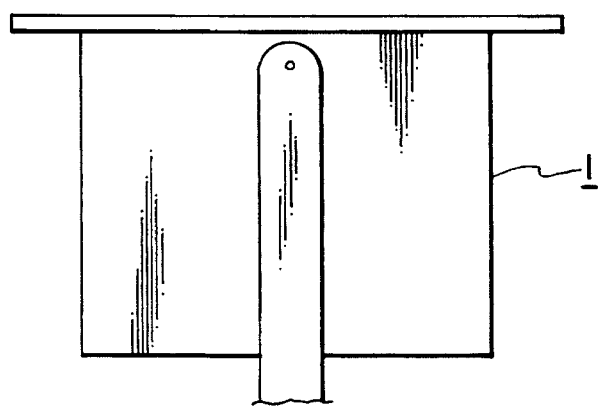
FIG. 3 is a side view of a powder feed box.
Figure 4:
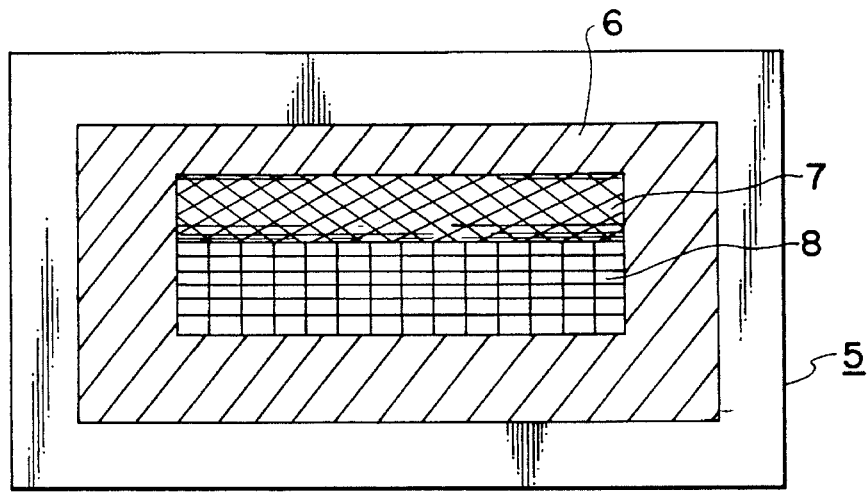
FIG. 4 is a plan view of a mold.
Figure 5:
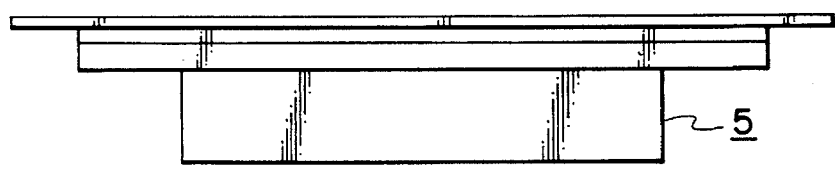
FIG. 5 is an elevation view of a mold.
Figure 6:
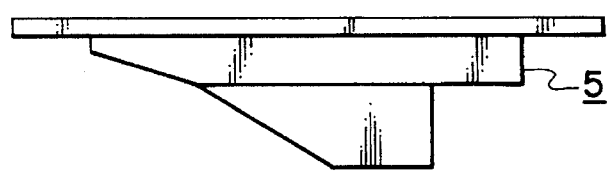
FIG. 6 is a side view of a mold.

A 4 kg amount of the thermoplastic elastomer powder composition prepared in Example 2 was put in a stainless steel rectangular container (i.e., a powder feed box) 1 shown in FIGS. 1 to 3. The rectangular container had a rectangular opening 2 having a size of 600 mm×220 mm and a depth of 210 mm and was mounted on a single screw rotary device 4. A nickel electroformed mold 5 shown in FIGS. 4 to 6, provided with an opening 6 having the same size as that of the opening 2 shown in FIG. 1, was preheated in a gas oven at 300° C. This mold had a thickness of 3 mm and a complicated configuration such that the internal surface had a rope pattern 7 and a leather grain pattern 8. Immediately after the surface temperature of the mold reached 250° C., the heated mold was aligned with the opening 2 of the above-mentioned feed box 1 in such a manner that the opening 6 (600 mm×220 mm) faced downward and an outer frame mounted around both openings was brought into close contact therewith, and the mold and box were then integrally fixed together by a clip 3. The device was immediately clockwise rotated by two turns at 30 rpm. and then counterclockwise rotated by two turns at 30 rpm. Thereafter, the device was clockwise shaken once through an angle of about 120° and counterclockwise shaken once through an angle of about 120°, to shake off excess powder deposited on the portion having a complicated configuration.

The rotation and shaking operation was stopped such that the opening 6 of the mold faced downward, the mold then taken out of the powder feed box, heated in a heating oven at 280° C. for one min. and cooled with water, and the molded film removed from the mold.

The resultant film as the molded article had a weight of 150 g and a thickness of 0.9 to 1.1 mm, and was free from underfill, and the rope pattern 7 and the leather grain pattern 8 were exactly reproduced. Further, in the molded article, a minute portion of the mold having a complicated configuration was properly reproduced, and the article had an even thickness and was free from pinholes.

A 3.8 kg amount of an elastomer powder composition free from the inclusion of foreign matter was recovered in the container, and an unused elastomer powder composition was added to the recovered elastomer powder composition, to a total weight of 4 kg, and the mixture molded in the same manner as described above. The resultant molded article had an excellent appearance and an even thickness.

TABLE 1

| Ex. No. | Powder Flowability (sec) | Blocking Tendency (%) | Powder Moldability |
| --- | --- | --- | --- |
| Ex. 1 | 20 | 1.1 | ++ |
| Ex. 2 | 17 | 0.9 | ++ |
| Ex. 3 | 22 | 0.9 | + |
| Ex. 4 | 21 | 1.3 | ++ |
| Ex. 5 | 20 | 1.4 | ++ |
| Ex. 6 | 17 | 0.9 | ++ |
| Ex. 7 | 22 | 1.6 | ++ |
| Ex. 8 | 21 | 1.6 | ++ |
| Ex. 9 | 22 | 1.0 | ++ |
| Ex. 10 | 22 | 0.9 | ++ |
| Comp. Ex. 1 | 40 | 10 | ++ |
| Comp. Ex. 2 | 29 | 1.0 | ± |
| Comp. Ex. 3 | 38 | 6.0 | ++ |

TABLE 2

| Ex. No. | Amount of Addition (pt. wt.) | Powder Flowability (sec) | Powder Moldability |
| --- | --- | --- | --- |
| Ex. 11 | 3.0 | 17 | ++ |
| Ex. 12 | 4.0 | 17 | ++ |
| Ex. 13 | 5.0 | 19 | + |
| Ex. 14 | 8.0 | 21 | + |
| Ex. 15 | 15 | 24 | + |
| Ex. 16 | 20 | 25 | + |
| Comp. Ex. 4 | 1.5 | 17 | − |

TABLE 3

| Ex. No. | Temp. (°C.) | Powder Flowability (sec) | Powder Moldability |
| --- | --- | --- | --- |
| Ex. 17 | 25 | 19 | ++ |
| Ex. 18 | 40 | 18 | ++ |
| Ex. 19 | 60 | 17 | ++ |

TABLE 4

| Ex. No | Powder Flowability (sec) | Powder Moldability |
| --- | --- | --- |
| Ex. 20 | 29 | ++ |
| Ex. 21 | 28 | + |
| Ex. 22 | 25 | ++ |
| Ex. 23 | 24 | ++ |
| Ex. 24 | 29 | + |
| Ex. 25 | 28 | ++ |
| Ex. 26 | 30 | + |
| Comp. Ex. 5 | 40 | ± |
| Comp. Ex. 6 | 51 | + |

We claim:

1. A thermoplastic elastomer powder composition for powder molding, comprising 100 parts by weight of the following thermoplastic elastomer powder (A) and 0.05 to 20 parts by weight of a fine powder having an average particle diameter of 0.01 to 10 μm;

(A) a powder of a thermoplastic elastomer comprising a partially crosslinked composition composed of an ethylene-α-olefin copolymer rubber and a polyolefin resin, said thermoplastic elastomer powder having a complex dynamic viscosity η*(1), as measured at frequency of 1 radian/sec and at 250° C., of 1.5×10 poise or less and a Newtonian viscosity index n, calculated from the following formula by using the above-mentioned complex dynamic viscosity η*(1) and the complex dynamic viscosity η*(1) and the complex dynamic viscosity η*(100) measured at a frequency of 100 radian/sec of 0.67 or less:

$$n=(\log \eta^*(100))/2$$

said fine powder is at least one member selected from the group consisting of calcium carbonate, aluminum hydroxide and aluminum oxide.

2. A composition as claimed in claim 1, wherein the content of the fine powder is from 0.1 to 10 parts by weight, based on 100 parts by weight of the thermoplastic elastomer powder.

3. A composition as claimed in claim 1, wherein the content of the fine powder is from 0.1 to 4 parts by weight, based on 100 parts by weight of the thermoplastic elastomer powder.

4. A composition as claimed in claim 1, wherein the ethylene-α-olefin copolymer rubber is an ethylene-propylene-ethylidene-norbornene rubber.

5. A composition as claimed in claim 1, wherein the ethylene-α-olefin copolymer rubber has a Mooney viscosity $ML_{1+4}$ (100° C.) of from 130 to 350.

6. A composition as claimed in claim 1, wherein the ethylene-α-olefin copolymer rubber is an oil-extended olefin copolymer rubber.

7. A composition as claimed in claim 1, wherein the polyolefin resin is polypropylene, a copolymer of propylene with ethylene or a copolymer of propylene with butene.

8. A composition as claimed in claim 1, wherein the proportion of the ethylene-α-olefin copolymer rubber to the olefin resin is from 5:95 to 80:20 in terms of the weight ratio.

9. A composition as claimed in claim 1, wherein said fine powder is calcium carbonate.

10. A composition as claimed in claim 1, wherein said fine powder is an aluminum hydroxide.

11. A composition as claimed in claim 1, wherein said fine powder is an aluminum oxide.

12. A thermoplastic elastomer powder composition for powder molding, comprising 100 parts by weight of the following thermoplastic elastomer powder (A) and 0.05 to 20 parts by weight of a fine powder, based on 100 parts of (A), having an average particle diameter of 0.01 to 10 μm;

(A) a powder of a thermoplastic elastomer comprising a partially crosslinked composition composed of an ethylene-α-olefin copolymer rubber and a polyolefin resin, said thermoplastic elastomer powder having a complex dynamic viscosity η*(1), as measured at frequency of 1 radian/sec and at 250° C., of 1.5×10 poise or less and a Newtonian viscosity index n, calculated from the following formula by using the above-mentioned complex dynamic viscosity η*(1) and the complex dynamic viscosity η*(1) and the complex dynamic viscosity η*(100) measured at a frequency of 100 radian/sec of 0.67 or less:

$$n=(\log \eta^*(100))/2$$

wherein said fine powder is at least one pigment selected from the group consisting of organic pigments and inorganic pigments.

13. A composition as claimed in claim 12, wherein said pigment is an inorganic pigment.

14. A composition as claimed in claim 12, wherein said pigment is a carbon black.

15. A composition as claimed in claim 12, wherein 0.1 to 10 parts by weight of said fine powder are used.

* * * * *